US012012061B2

United States Patent
Stählin et al.

(10) Patent No.: US 12,012,061 B2
(45) Date of Patent: Jun. 18, 2024

(54) POST VEHICLE CRASH DIAGNOSTICS TO EXPEDITE AID

(71) Applicant: Continental Automotive Systems, Inc., Auburn Hills, MI (US)

(72) Inventors: Ulrich Stählin, Eschborn (DE); Brian J Marlett, Macomb, MI (US); Mitchell E Clelland, Commerce Township, MI (US); Paul D Bingham, Canton, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 199 days.

(21) Appl. No.: 17/649,195

(22) Filed: Jan. 28, 2022

(65) Prior Publication Data

US 2023/0242058 A1    Aug. 3, 2023

(51) Int. Cl.
| | |
|---|---|
| *B60R 21/0132* | (2006.01) |
| *G07C 5/08* | (2006.01) |
| *B60R 21/00* | (2006.01) |
| *B60R 21/01* | (2006.01) |
| *B60R 21/013* | (2006.01) |

(52) U.S. Cl.
CPC ........ *B60R 21/0132* (2013.01); *G07C 5/0808* (2013.01); *G07C 5/0816* (2013.01); *B60R 2021/0027* (2013.01); *B60R 2021/01204* (2013.01); *B60R 2021/01313* (2013.01); *B60R 2021/01315* (2013.01)

(58) Field of Classification Search
CPC ............ B60R 21/0132; B60R 21/0136; B60R 2021/01313; B60R 2021/01317; G07C 5/0808; G07C 5/0816
See application file for complete search history.

(56) References Cited

U.S. PATENT DOCUMENTS

| | | | |
|---|---|---|---|
| 10,282,922 B1 | 5/2019 | Nejah et al. | |
| 11,247,625 B2* | 2/2022 | Pham | B60R 21/01504 |
| 2004/0036261 A1* | 2/2004 | Breed | B60R 21/0136 |
| | | | 280/735 |
| 2004/0215382 A1* | 10/2004 | Breed | B60N 2/0248 |
| | | | 701/45 |
| 2009/0051510 A1 | 2/2009 | Follmer et al. | |
| 2015/0246654 A1 | 9/2015 | Tadic et al. | |
| 2016/0144817 A1* | 5/2016 | Chambers | B60R 21/0136 |
| | | | 340/436 |
| 2017/0148235 A1 | 5/2017 | Yakub et al. | |
| 2018/0154906 A1* | 6/2018 | Dudar | B60W 50/0225 |
| 2019/0304207 A1* | 10/2019 | Light-Holets | G08G 1/205 |
| 2021/0092685 A1 | 3/2021 | Lekutai | |

OTHER PUBLICATIONS

International Search Report dated May 12, 2023, of International Application PCT/US2023/061526.

* cited by examiner

*Primary Examiner* — John Kwon

(57) ABSTRACT

A vehicle diagnostic and communication system includes a controller with computer executable instructions configured to diagnose operational capability of vehicle operating systems in response to a recognized collision event. The controller is further configured to determine a severity of damage to the vehicle operating systems based on the diagnoses and generate a communication signal based on the determined severity of damage to the vehicle for transmission. The system determines which of a plurality of service providers to send the communication signal based on the severity of damage to the vehicle.

18 Claims, 2 Drawing Sheets

POST VEHICLE CRASH DIAGNOSTICS TO EXPEDITE AID

TECHNICAL FIELD

The present disclosure relates to method and system for diagnosing vehicle health responsive to a collision event.

BACKGROUND

Vehicles include safety systems that are actuated in response to a collision event. The safety systems gather information indicative of a severity of the collision and may communicate that information to emergency services. Exterior damage to the vehicle is easily observed, however, damage to internal vehicle systems may not be readily apparent. Automotive suppliers and manufactures continually seek to improve vehicle safety, efficiency and capabilities.

The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method of communicating vehicle health according to a disclosed example embodiment includes, among other possible things, recognizing a collision event with at least one device associated with a safety system of a vehicle, diagnosing operational capability of vehicle operating systems with an onboard vehicle controller in response to the recognized collision event, determining a severity of damage to the vehicle operating systems based on the diagnoses, generating a communication signal based on the determined severity of damage to the vehicle for transmission and determining which of a plurality of service providers to send the communication signal based on the severity of damage to the vehicle.

Another disclosed embodiment of the foregoing method further includes sending the communication to the determined service providers through a communication system associated with the vehicle controller.

In another disclosed embodiment of any of the foregoing methods, the communication system comprises a vehicle to everything communication system.

In another disclosed embodiment of any of the foregoing methods, recognizing the collision event comprises actuation of the at least one device associated with the vehicle safety system.

In another disclosed embodiment of any of the foregoing methods, wherein the at least one device comprises one of an airbag, an automated seatbelt, a contact sensor or an acceleration sensor.

In another disclosed embodiment of any of the foregoing methods, diagnosing operational capability comprises confirming operation of each of a vehicle braking system, steering system, cooling system and propulsion system.

In another disclosed embodiment of any of the foregoing methods, diagnosing operational capability comprises confirming electrical communication with devices on the vehicle coupled to a vehicle electrical system.

In another disclosed embodiment of any of the foregoing methods, diagnosing operational capability comprises confirming operation of an in-vehicle communication system.

In another disclosed embodiment of any of the foregoing methods, diagnosing operational capability comprises determining an orientation of occupant seats.

In another disclosed embodiment of any of the foregoing methods, determining a severity of damage to the vehicle comprises determining if any vehicle systems are inoperable such that operation of the vehicle is not safely operable.

In another disclosed embodiment of any of the foregoing methods, determining a severity of damage to the vehicle comprises determining if damage to any of the vehicle systems present a risk to vehicle occupants.

In another disclosed embodiment of any of the foregoing methods, the communication signal comprises a portion related to vehicle health and a portion related to occupant risk.

In another disclosed embodiment of any of the foregoing methods, the plurality of service providers includes providers that provide vehicle repair surfaces and/or providers that provide occupant aid services.

A vehicle diagnostic and communication system according to another example embodiment includes, among other possible things, a controller with computer executable instructions configured to diagnose operational capability of vehicle operating systems in response to a recognized collision event, determine a severity of damage to the vehicle operating systems based on the diagnoses, generate a communication signal based on the determined severity of damage to the vehicle for transmission and determine which of a plurality of service providers to send the communication signal based on the severity of damage to the vehicle.

In another disclosed embodiment of the foregoing system, the controller is further configured to send the communication to the determined service providers through a communication system associated with the vehicle controller.

In another disclosed embodiment of any of the foregoing systems, the controller is configured to recognize the collision event based on actuation of the at least one device associated with the vehicle safety system.

In another disclosed embodiment of any of the foregoing systems, diagnosing operational capability comprises confirming operation of each of a vehicle braking system, steering system, cooling system and propulsion system.

In another disclosed embodiment of any of the foregoing systems, determining a severity of damage to the vehicle comprises determining if any vehicle systems are inoperable such that operation of the vehicle is not safely operable and/or present a risk to vehicle occupants.

A computer readable medium according to another example disclosed embodiment includes instructions executable by a controller for diagnosing vehicle health and risk to occupant safety, wherein the instructions comprise instructions prompting an in-vehicle controller to diagnose operational capability of vehicle operating systems in response to a recognized collision event, determine a severity of damage to the vehicle operating systems based on the diagnoses, generate a communication signal based on the determined severity of damage to the vehicle for transmission and determine which of a plurality of service providers to send the communication signal based on the severity of damage to the vehicle.

In another example embodiment of the foregoing computer readable medium, the instructions further comprise instructions prompting the in-vehicle controller to send the communication to the determined service providers through a communication system associated with the vehicle controller.

In another example embodiment of the foregoing computer readable medium, the instructions further comprise instructions prompting the in-vehicle controller to determine a severity of damage by determining if any vehicle systems are inoperable such that operation of the vehicle is not safely operable and/or present a risk to vehicle occupants.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
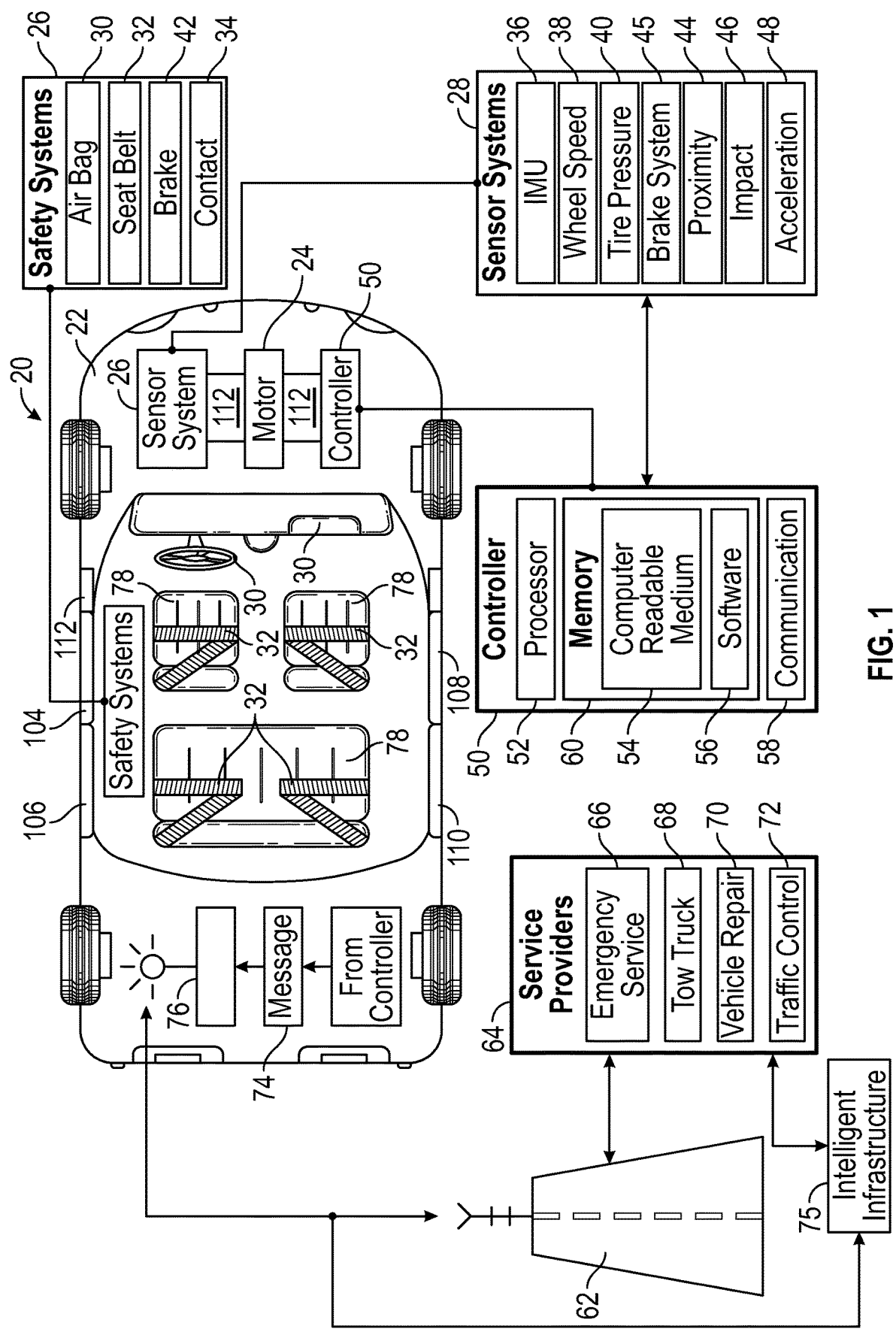
FIG. 1 is a schematic illustration of a vehicle including an example disclosed control system.

Referring to FIG. 1, an example diagnostic and communication system 20 for a vehicle 22 diagnoses and communicates vehicle health responsive to a collision event. The system 20 further communicates information indicative of vehicle health to an appropriate service provider and/or intelligent infrastructure system based on the diagnosis. Diagnosing the actual specific damage to the vehicle 22 and communicating that information to emergency services and/or to an intelligent infrastructure system improves and accelerates an appropriate response to aid vehicle occupants.

The example vehicle 22 includes a motor 24, sensor systems 28, vehicle operating systems and safety systems 26. In one disclosed example embodiment, the vehicle safety systems 26 include safety devices, such as for example, airbags 30, seat belts 32, automated brake systems 42 as well as contact sensors 34 for detecting contact. The devices of the safety system 26 are disclosed by way of example and it is within the contemplation of this disclosure that other safety devices may be part of a vehicle safety system 26. The example safety system 26 generates a signal that is indicative of a severity of a collision event. The severity of the collision event may be used to indicate how to actuate the safety devices.

The sensor systems 28, in one disclosed example embodiment, include an inertial measurement unit (IMU) 36, wheel speed sensor 38, tire pressure sensor 40, brake system sensors 45, proximity sensors 44, impact sensors 46 and acceleration sensors 48. Other sensors systems may also be included and are within the contemplation and scope of this disclosure.

The sensor systems 28 provide information that is indicative of vehicle odometry and also provide information utilized by the safety systems 26 to prompt actuation. Information from the sensor systems 28 may also be utilized to diagnose vehicle health and operational condition.

A controller 50 is schematically illustrated and includes a processor 52, a memory device 60, a computer readable medium 54 and a communication module 58. Software instructions 56 may be stored on the memory device 60 and/or the computer readable medium 54.

The example controller 50 may be a separate controller dedicated to the control system 20 are may be part of an overall vehicle controller. Accordingly, example controller 50 relates to a device and system for performing necessary computing and/or calculation operations of the control system 20. The controller 50 may be specially constructed for operation of the control system 20, or it may comprise at least a general-purpose computer selectively activated or reconfigured by software instructions 56 stored in the memory device 60. The computing system can also consist of a network of (different) processors.

The instructions for configuring and operating the controller 50, the control system 20 and the processor 52 are embodied in the software instructions 56 that may be stored on a computer readable medium 54. The computer readable medium 54 may be embodied in structures such as, but is not limited to, any type of disk including floppy disks, optical disks, CD-ROMs, magnetic-optical disks, read-only memories (ROMs), random access memories (RAMS), EPROMs, EEPROMs, magnetic or optical cards, application specific integrated circuits (ASICs), or any type of media suitable for storing electronic instructions, and each coupled to a computer system bus. The disclosed computer readable medium may be a non-transitory medium such as those examples provided.

Moreover, the software instructions 56 may be saved in the memory device 60. The disclosed memory device 60, may include any one or combination of volatile memory elements (e.g., random access memory (RAM, such as DRAM, SRAM, SDRAM, VRAM, etc.) and/or nonvolatile memory elements (e.g., ROM, hard drive, tape, CD-ROM, etc.).

The software instructions 56 in the memory device 60 may include one or more separate programs, each of which includes an ordered listing of executable instructions for implementing logical functions. The disclosed controller 50 is configured to execute the software instructions 56 stored within the memory device 60, to communicate data to and from the memory device 60, and to generally control operations pursuant to the software. Software in memory, in whole or in part, is read by the processor 52, perhaps buffered within the processor, and then executed.

A communication module 58 controls the sending and receiving of messages by a transceiver 76 located within the vehicle 22. The example transceiver 76 provides for communication with a network, schematically indicated at 62. The network 62 provides for communication with any of a plurality of service providers 64. In this example, the service providers include emergency services 66, such as the fire department and emergency medical services. The example service providers 64 further include tow truck service 68 and vehicle repair facilities 70.

In one disclosed example, an intelligent infrastructure 75 proximate the vehicle 22 may communicate directly with the system 20 through the transceiver 76 without the need of the communication network 62. The intelligent infrastructure 75 may then communicate with the different service providers 64 including traffic control devices 72. The intelligent infrastructure 75 may be incorporated into structures and devices along the roadway and proximate the vehicle 22. The intelligent infrastructure may include a V2X configured device that provides for communication between different traffic control devices 72 and other vehicles proximate the example vehicle 22. Moreover, it is within the contemplation of this disclosure that the intelligent infrastructure 75 may include V2X configured devices as well as other devices that provide for communication of information proximate the vehicle 22.

Although a transceiver 76 mounted in the vehicle 22 is disclosed by way of example, other communication devices that receive and exchange information with the vehicle controller 50 may also be utilized and are within the contemplation of this disclosure. For example, a vehicle operator's mobile phone coupled to the vehicle through a wireless interface may serve and the communication device for sending messages to the network 62. Moreover, the example network 62 may be any wireless communications device and/or system that enables communication between the vehicle 22 and the various service providers 64.

Figure 2:
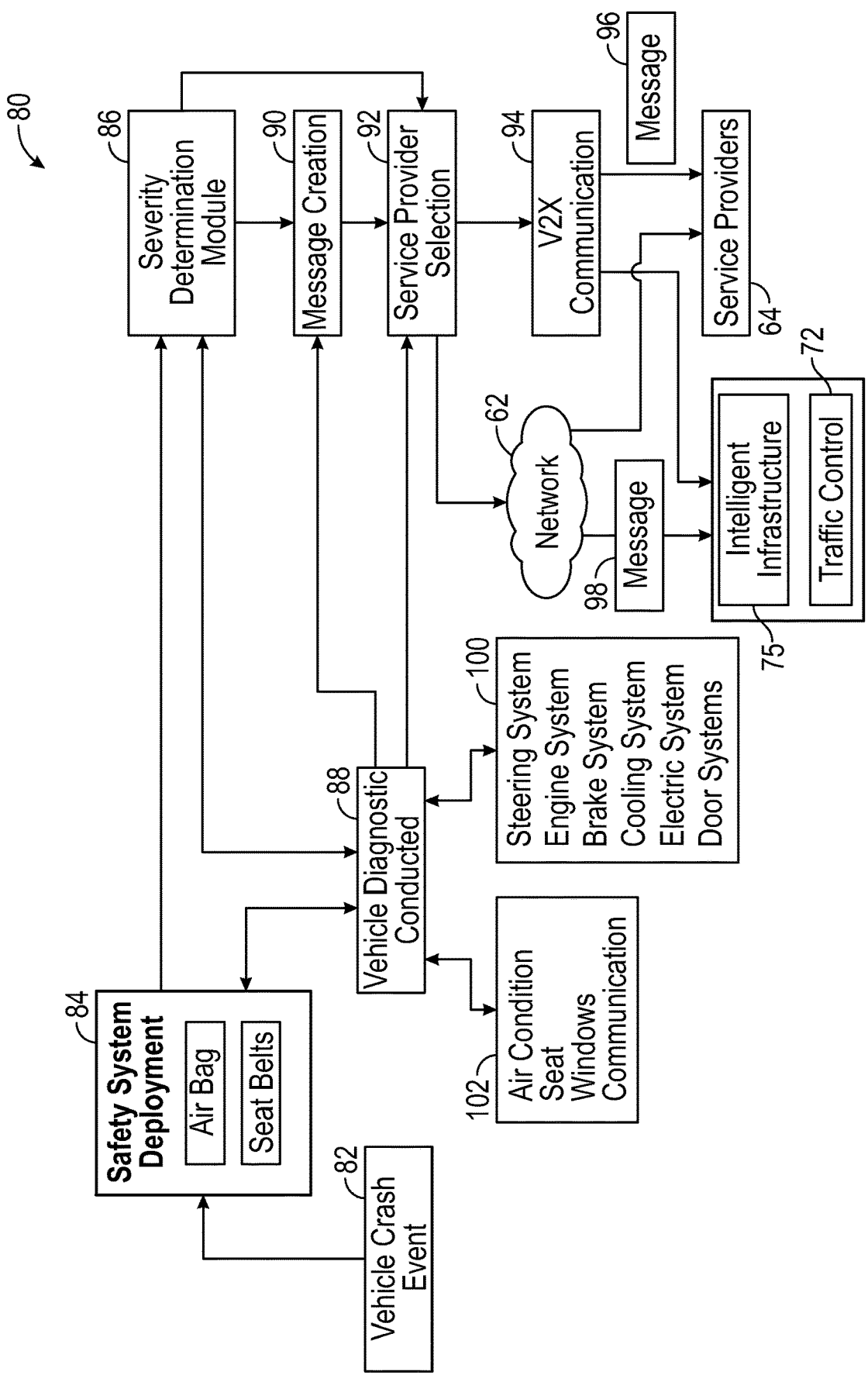
FIG. 2 is a flow diagram schematically illustrating a disclosed example process for communicating vehicle operational health.

Referring to FIG. 2, with continued reference to FIG. 1, the example system 20 initiates a vehicle diagnostic process of vehicle sensor systems 28 in response to a detected collision event. The vehicle diagnostic process and any resulting communication is tailored to the severity of the collision event. Flow diagram 80 illustrates one example embodiment of operation of the example system 20. A vehicle collision event as indicated at 82 prompts actuation of the safety system 26 as indicated at 84. The actuation of the safety system 26 is tailored to the sensed severity of the collision based on information obtained from the safety system devices and/or the sensor systems 28. As appreciated, the vehicle 22 includes many systems that provide vehicle odometry information that can prompt actuation of the safety systems 26 in response to a detected collision event.

In one example embodiment, the collision event triggers actuation of the air bags 30 and the active seat belts 32. The collision event is recognized by the system 20 and triggers a vehicle diagnostic routine as is schematically shown at 88. The diagnostic routine can include a full vehicle diagnosis of all vehicle systems 100, or a targeted diagnosis based on detected damage to the vehicle.

In one disclosed, example, the vehicle systems 100 includes a steering system, motor 24, engine system, brake system, cooling system, electric system and door systems. As appreciated, other vehicle systems, not specifically disclosed, may also be checked to determine operability within the scope and contemplation of this disclosure.

In one disclosed example, a targeted diagnosis is performed based on the collision event. The doors 104, 106, 108 and 110 may or may not be damaged. However, all the doors 104, 106, 108 and 110 may be tested. Alternatively, only the one door 104 may be tested. For example, if proximity sensors 44 indicate that a driver's door 104 was contacted, the system 20 may direct diagnostic to vehicle systems that involve the door 104. For example, a vehicle electric bus system 112 can be diagnosed to determined operability. If the electric bus system 112 is damaged at the driver's door 104, the window may not work to enable egress by the driver. Moreover, damage to the driver's door that prevents operation of the windows may also prevent operation of the latch. Such information may aid emergency services so that they understand prior to arriving on the scene that driver may be trapped within the vehicle. Moreover, the system 20 may further check tire pressures on the driver's side of the vehicle to further assess vehicle damage.

In another disclosed example, the overall operability of the vehicle 22 is determined to detect any inoperable conditions and/or system operating conditions that are not within a predefined criteria.

The vehicle diagnostic module 88 may further evaluate vehicle systems 100 to determine effects on occupant safety and comfort. The determination is made in view of current environmental conditions because current conditions may affect the severity of impact of inoperable or degraded conditions. The vehicle diagnostic system 100 evaluates information from occupant comfort systems schematically indicated at 102. Disclosed examples of such systems include air conditioning systems, seat position, window systems and communication systems. Such systems may not be critical to vehicle operation but may have impact operation due to the effects on occupants. For example, a degraded or inoperable air conditioning system may not present a problem in mild weather conditions. However, in extreme heat conditions, failure of the air conditioning system may be of concern. More so if combined with failure of the window systems.

In other example, a position of an occupant seat may be considered. The position of the occupant seats 78 after a collision event may provide information further indicative of severity. A seat is at an extreme position, or twisted completely out of position, may be indicative of other damage that would prevent vehicle operation.

The vehicle diagnostic module 88 communicates with a severity determination module 86. The severity determination module 86 uses information regarding vehicles systems 100 and occupant comfort systems 102 to determine a severity of damage to the vehicle 22. The severity of damage can be categorized according to any predefined criteria. Such criteria may include specific information relating to the damage to the vehicle and/or a broad category of vehicle operability. Moreover, the information provided may be arranged in any manner that provided information sufficient for the service provider 64 to ascertain what is required in response.

A message 74 (FIG. 1) is created as schematically indicated at 90 with input from at least the vehicle diagnostic module 88 and the severity determination module 86. The appropriate service provider 64 is selected as indicated at 92 based in input from the severity determination module and the diagnostic module 88. As appreciated, other information may be used in determining which service provider is appropriate. Moreover, the system 20 may include a default setting such that regardless of any determination, the message 74 is sent to a location that gathers information for evaluation. This could include direct communication with intelligent infrastructure 75.

Each level of severity requires different levels of response. For example, a collision without an airbag deployment and little to no vehicle damage may result only in a message to a repair facility for future use without any immediate response. In contrast, a collision with an airbag deployment and significant damage may result in the message being sent to emergency services to enable a prompt response.

The message 74 may be sent over the communication network 62, such as a cellular network to the appropriate service providers. The message 74 may also be sent to an intelligent infrastructure device 75 according to a vehicle to everything (V2X) as indicated at 94. The V2X protocol 94 communicates information to elements immediately proximate the vehicle 22 to enable appropriate reaction. The elements may include other vehicles in traffic surrounding the vehicle 22 as well as an intelligent infrastructure devices 75 and traffic control system as is indicated at 72. Other drivers may modify operation to slow down prior to seeing the collision to provide a safer environment around a crash site. The information to the other drivers may also enable rerouting around the crash site.

The system 20 may modify operation of traffic control devices 72 to further reroute traffic in view of the collision and severity. Moreover, the system 20 may further modify operation to enable more efficient and faster response by emergency responders. As appreciated, the information provided by the system 20 can be distributed according to the V2X protocol 94 to create a safer more efficient response to the vehicle collision. The system 20 may also forward the information to the intelligent infrastructure 75 and to further service providers 64.

Additionally, the system 20 need not send only one message 74, but may tailor several messages based on the evaluated condition of the vehicle 22 and the needs of the service providers 64. As appreciated, information needed by the emergency responder may be different than that needed by the vehicle repair facility, or further the traffic-infrastructure control system 72. Accordingly, one message is indicated at 98 for sending to the traffic-infrastructure control system 72 and another message 96 is generated for sending to the appropriate service providers 64. The messages 98 and 96 may be sent multiple times and predefined intervals to assure receipt and a response. the messages 98, 96 may also repeat until a confirmation message is sent and received by the system 20.

In this disclosed example, the diagnostic module 88, severity determination module 86, service provider selection 92 and all the other modules are embodied as part of the software instructions 56 executed by the processor 52 of the controller. The software instructions 56 may divide each module as disclosed in this example embodiment and/or may divide each action, determination and analysis in a different matter in a sequence that differs from the disclosed example embodiment. It is within the contemplation and scope of this disclosure that the disclosed analysis, determination and actions may be implemented according to other sequences and at different order depending on specific application parameters, capabilities and requirements.

Accordingly, the example system 20 prompts a comprehensive vehicle diagnostic process to determine vehicle operability in response to a collision event to aid and improve a response from service providers, surrounding infrastructure control systems and emergency responders.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method of communicating vehicle health comprising:
   recognizing a collision event with at least one device associated with a safety system of a vehicle;
   diagnosing operational capability of vehicle operating systems with an onboard vehicle controller in response to the recognized collision event, wherein the vehicle operating systems comprise at least one of door systems of the vehicle and window systems of the vehicle;
   determining a severity of damage to the vehicle operating systems based on the diagnoses;
   generating a communication signal based on the determined severity of damage to the vehicle for transmission;
   determining a service provider from among a plurality of service providers to send the communication signal based on the severity of damage to the vehicle; and
   transmitting the communication to the service provider through a communication system associated with the vehicle controller.

2. The method as recited in claim 1, wherein the communication system comprises a vehicle to everything communication system.

3. The method as recited in claim 1, wherein recognizing the collision event comprises actuation of the at least one device associated with the vehicle safety system.

4. The method as recited in claim 3, wherein the at least one device comprises one of an airbag, an automated seatbelt, a contact sensor or an acceleration sensor.

5. The method as recited in claim 1, wherein diagnosing operational capability comprises confirming operation of each of a vehicle braking system, steering system, cooling system and propulsion system.

6. The method as recited in claim 1, wherein diagnosing operational capability comprises confirming electrical communication with devices on the vehicle coupled to a vehicle electrical system.

7. The method as recited in claim 1, wherein diagnosing operational capability comprises confirming operation of an in-vehicle communication system.

8. The method as recited in claim 1, wherein diagnosing operational capability comprises determining an orientation of occupant seats.

9. The method as recited in claim 1, wherein determining a severity of damage to the vehicle comprises determining if any vehicle systems are inoperable such that operation of the vehicle is not safely operable.

10. The method as recited in claim 1, wherein determining a severity of damage to the vehicle comprises determining if damage to any of the vehicle systems present a risk to vehicle occupants.

11. The method as recited in claim 1, wherein the communication signal comprises a portion related to vehicle health and a portion related to occupant risk.

12. The method as recited in claim 1, wherein the plurality of service providers includes providers that provide vehicle repair surfaces and/or providers that provide occupant aid services.

13. A vehicle diagnostic and communication system comprising:
   a controller with computer executable instructions configured to:
      diagnose operational capability of vehicle operating systems in response to a recognized collision event, wherein the vehicle operating systems comprise at least one of door systems of the vehicle and window systems of the vehicle;
      determine a severity of damage to the vehicle operating systems based on the diagnoses;
      generate a communication signal based on the determined severity of damage to the vehicle for transmission;

determine a service provider from among a plurality of service providers to send the communication signal based on the severity of damage to the vehicle; and transmit the communication to the service provider through a communication system associated with the vehicle controller.

14. The vehicle diagnostic and communication system as recited in claim 13, wherein controller is configured to recognize the collision event based on actuation of the at least one device associated with the vehicle safety system.

15. The vehicle diagnostic and communication system as recited in claim 13, wherein diagnosing operational capability comprises confirming operation of each of a vehicle braking system, steering system, cooling system and propulsion system.

16. The vehicle diagnostic and communication system as recited in claim 13, wherein determining a severity of damage to the vehicle comprises determining if any vehicle systems are inoperable such that operation of the vehicle is not safely operable and/or present a risk to vehicle occupants.

17. A computer readable medium comprising instructions executable by a controller for diagnosing vehicle health and risk to occupant safety, wherein the instructions comprise instructions prompting an in-vehicle controller to:

diagnose operational capability of vehicle operating systems in response to a recognized collision event, wherein the vehicle operating systems comprise at least one of door systems of the vehicle and window systems of the vehicle;

determine a severity of damage to the vehicle operating systems based on the diagnoses;

generate a communication signal based on the determined severity of damage to the vehicle for transmission;

determine a service provider from among a plurality of service providers to send the communication signal based on the severity of damage to the vehicle; and transmit the communication to the service provider through a communication system associated with the vehicle controller.

18. The computer readable medium as recited in claim 17, wherein the instructions further comprise instructions prompting the in-vehicle controller to determine a severity of damage by determining if any vehicle systems are inoperable such that operation of the vehicle is not safely operable and/or present a risk to vehicle occupants.

* * * * *